Figure 1:
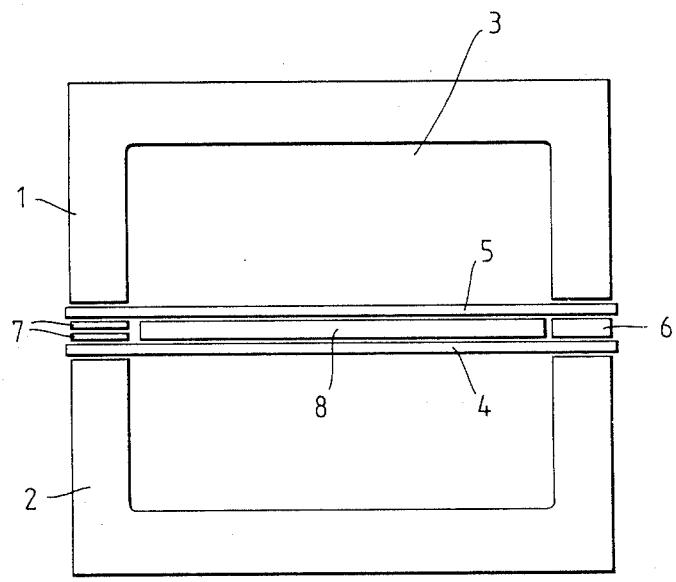

United States Patent [19]

Cattanach

[11] Patent Number: 4,876,055
[45] Date of Patent: Oct. 24, 1989

[54] SHAPING OF SYNTACTIC FOAM

[75] Inventor: James B. Cattanach, Middlesbrough, England

[73] Assignee: Imperial Chemical Industries PLC, London, England

[21] Appl. No.: 151,283

[22] Filed: Feb. 1, 1988

[51] Int. Cl.[4] .................. B29C 51/28; B29C 47/06; B29C 67/16

[52] U.S. Cl. .................................. 264/512; 264/313; 264/314; 264/316; 264/321; 264/322; 264/DIG. 6; 425/DIG. 14; 428/312.6; 428/313.3

[58] Field of Search ............... 264/DIG. 6, 314, 512, 264/321, 322, 313, 316; 428/313.3, 312.6; 425/DIG. 14

[56] References Cited

U.S. PATENT DOCUMENTS

| 3,524,794 | 8/1970 | Jonnes et al. ............... | 428/313.3 |
| 3,676,033 | 7/1972 | Buonaiuto ................... | 264/321 X |
| 3,954,926 | 5/1976 | Pahl et al. .................. | 264/46.4 |
| 4,559,262 | 12/1985 | Cogswell et al. ............ | 428/294 |
| 4,560,523 | 12/1985 | Plumley et al. ............. | 264/314 X |
| 4,576,776 | 3/1986 | Anderson .................... | 264/314 X |
| 4,608,220 | 8/1986 | Caldwell et al. ............ | 264/314 X |

FOREIGN PATENT DOCUMENTS

| 0056703 | 7/1982 | European Pat. Off. . |
| 0102159 | 3/1984 | European Pat. Off. . |
| 0195561 | 9/1986 | European Pat. Off. . |
| 0195562 | 9/1986 | European Pat. Off. . |

Primary Examiner—Philip Anderson
Attorney, Agent, or Firm—Cushman, Darby & Cushman

[57] ABSTRACT

A method of forming a shaped article from a stock of preformed, thermoplastic, syntactic foam material of hollow microspheres in a thermoplastic polymer matrix, comprising heating the preformed syntactic foam to a temperature above the softening point of thermoplastic polymer matrix and applying differential pressure over at least one surface of the foam material through the medium of a plastically deformable diaphragm member to cause the foamed material to conform to a desired shape. Shaped articles of syntactic foam material, optionally having a surface coating of unfoamed, preferably fibre reinforced thermoplastics materials are provided in a more versatile and convenient manner than curing or sintering syntactic foam material in a mould.

8 Claims, 1 Drawing Sheet

SHAPING OF SYNTACTIC FOAM

SHAPING OF SYNTACTIC FOAM

This invention relates to a method of forming shaped articles from a syntactic foam material.

There is a demand for high performance, light weight structures particularly in the aerospace industries. For example, improvements in radome construction are constantly sought. A radome is a cover for radar transmitting and receiving antennas, which protects the equipment from the environment during use, but permits microwave transmission with the minimum loss and distortion. In this, and other applications, a syntactic foam material, comprising hollow microspheres embedded in a resin matrix, is a useful component of construction but is limited in terms of methods of fabrication because the microspheres are easily crushed if subjected to compression. As a result shaped articles are generally made by in situ construction in a mould of the desired shape thus occupying a mould for a considerable time whilst materials are cured or sintered in the mould. It would be advantageous to be able to form a shaping from a preformed stock of syntactic foam material.

According to the present invention there is provided a method of forming a shaped article from a stock of preformed, thermoplastic, syntactic foam material of hollow microspheres in a thermoplastic polymer matrix, comprising heating the preformed syntactic foam to a temperature above the softening point of thermoplastic polymer matrix and applying differential pressure over at least one surface of the foam material through the medium of a plastically deformable diaphragm member to cause the foamed material to conform to a desired shape.

The plastically deformable diaphragm which is used to urge the foam stock into the desired shape may be an organic thermoplastic material which has a minimum forming temperature equal to or greater than the flow temperature of the thermoplastic matrix of the foam stock. Preferably, the diaphragm is of a plastically deformable metal and desirably is a superplastically deformable metal as described in European Patent Publication No. 155 820. When the diaphragm material is an organic, thermoplastic polymer it may be chosen so that it becomes integral with the foam stock during the shaping of the article and forms part of the final shaped article. Suitable procedures are described in European Patent Publication Nos. 195 561 and 195 562. When a metal diaphragm is used it may be left in place after the shaping if it can be sufficiently adhered to the foam stock to perform a useful function but in normal circumstances would be detached from the article after the shaping operation.

Preferably, the foam stock is shaped whilst confined between a pair of diaphragms.

Whether or not the shaping diaphragms are left in place after the shaping operation it may be useful to provide the foam stock with a coating of unfoamed and preferably, reinforced material which will confer beneficial properties on the article such as strength, stiffness, resistance to rain erosion etc. This coating may be made integral with the flat foam stock before it is shaped or may be laid up in the shaping mould in contact with the foam stock so that it becomes integral in the shaped article as a result of the shaping operation. In one embodiment the coating consists of a fibre reinforced thermoplastic layer in which the fibres are continuous, collimated fibres, interwoven or overlaid to provide quasi-isotropic reinforcement in the layer. Suitable fibre reinforced materials are described, for example, in European Patent Publication Nos. 56703 and 102 159. The process is operable using relatively low differential pressures because the foam stock is a preformed and already consolidated stock of hollow microspheres in thermoplastic.

The syntactic foam stock polymer matrix can be produced by known methods but it is preferred that the use of solvents to dissolve the polymer to aid dispersion of the microspheres should be avoided because of the difficulty of removing residual solvent. It is preferred that the microspheres be dispersed in molten polymer.

Suitable hollow microspheres may be obtained from Croxton and Garry Ltd of Dorking who supply a range of glass microspheres of various densities and crush strength. The grade B38/4000 is particularly suitable as it has a high crush strength (nominally 4000 psi). Because of the relatively low pressures required in this process less dense microspheres of lower crush strength may be used.

The method of the invention permits a suitable constructional material having a syntactic foam core, optionally surfaced with a thermoplastic material to be prepared under ideal conditions as a flat slab stock and to be subsequently thermoformed into a shaped article. Surprisingly the method of the invention enables shaping to take place without substantial microsphere breakage.

The invention is further illustrated with reference to the following examples.

EXAMPLE 1

Polyetheretherketone (PEEK) having a melt viscosity of 100 $Ns/m^2$ measured at 400° C. at a shear rate of 1,000 $sec^{-1}$ and B38/4000 (obtained from Croxton and Garry Ltd of Dorking) were blended dry at a ratio of 2:1 by weight and then consolidated in a matched metal mould of dimensions 6 in.×8 in. in a press capable of platen temperatures of 400° C. The top and bottom faces were separated from the metal mould with aluminium foil treated with Frekote mould release agent.

The mould and powder were heated to 400° C. for 30 minutes without pressure being applied. A pressure of 6 tonnes was then applied for five minutes. Platens and mould were then air cooled to 250° C. and then were cooled to room temperature at an average cooling rate of 15°/minute.

EXAMPLE 2

The procedure of Example 1 was repeated except in that the dry blend was consolidated in the mould between two skins each consisting of four plies of unidirectionally reinforced prepreg of glass fibres in polyetheretherketone (melt viscosity 100 $Ns/m^2$). The four plies of each skin were laid up to give a quasi isotropic distribution of fibres with the unidirectional fibres of each ply being at 45° to the adjacent layer (ie +45°, 90°, −45°, 0°).

This process was repeated using unidirectional carbon fibre in polyetheretherketone (melt viscosity 100 $Ns/m^2$. The flexural modulus and strength of these sandwich structures were measured and are recorded below.

| Composite | Flexural Modulus GN/m² | Flexural Strength MN/m² |
| --- | --- | --- |
| Glass fibre in PEEK skin/foam core | 10.7 | 161 |
| Carbon fibre in PEEK skin/foam core | 19 | 274 |

EXAMPLE 3

Shaping of the composites containing syntactic foam prepared in Examples 1 and 2 is now described with reference to FIG. 1 which shows a typical moulding apparatus for use in the invention.

In FIG. 1 mating shells, 1 and 2 provide a chamber, shown generally as 3, within which shaping operations can be performed. Shells 1 and 2 are provided with heating means (not shown) so that chamber 3 can effectively act as an oven of controlled temperature. Means for providing pressure and vacuum are also provided (not shown). In FIG. 1 the shells seal on metal diaphragms 4 and 5 composed of a superplastically formable alloy. Diaphragms 4 and 5 are spaced apart by annular ring 6 corresponding in perimeter to the perimeter of shells 1 and 2. Ring 6 is provided with a bore 7 disposed radially through the annulus to which a vacuum source (not shown ) can be connected so that the space between diaphragms 4 and 5 can be evacuated. Foamed stock 8 to be shaped is shown located between diaphragms 4 and 5. In operation shells 4 and 5 are engaged with sufficient pressure to maintain a seal whilst the diaphragm shaping proceeds. Vacuum is applied at 7 to remove substantially all free air present between the diaphragms. A differential pressure is applied across opposing diaphragm faces, whilst the diaphragms and the workpiece are at an elevated temperature. After the desired shaping has been induced the shaping may be allowed to cool within the mould or the assembly of workpiece between the diaphragms may be removed whilst still under vacuum as an umbilical pack for cooling outside the mould.

Using an apparatus of the type described, having a shell outer diameter of about 190 mm, the product of Example 1 was formed between Supral alloy diaphragms (supplied by Superform Ltd of Worcester) using an annular separating ring 6 mm thick, with outer diameter 190 mm and inner diameter 156 mm. The workpiece used was a disc of diameter 150 mm having a thickness of 6 mm. The machine cavity 3 was preheated to 391° C. Shells 1 and 2 were then separated, and items 4, 5, 6 and 8 assembled cold. A vacuum of 720 mm Hg was drawn in the enclosed space, shells 1 and 2 were engaged to seal the assembled items. The cold pack (items 4, 5, 6 and 8) was allowed to gain heat for 16 minutes before applying air pressure to diaphragm 4, and the pack was removed after a total elapsed time of 50 minutes. During this elapsed time the conditions varied as follows:

| Elapsed time (mins) | Temperature (°C.) | Vacuum (mm Hg) | Pressure (bar) |
| --- | --- | --- | --- |
| Zero | [391] | 720 | 0 |
| 7 | | 600 | 0 |
| 16 | 394 | 600 | 0.35 |
| 19 | 394 | 600 | 0.7 |
| 24 | 389 | 600 | 1.05 |
| 32 | Items 6, 7 opened and closed for in-situ viewing of pack. | | |
| 36 | 389 | 575 | 1.4 |

-continued

| Elapsed time (mins) | Temperature (°C.) | Vacuum (mm Hg) | Pressure (bar) |
| --- | --- | --- | --- |
| 40 | Opened; pack removed for viewing; closed. | | |
| 42 | 389 | 575 | 1.75 |
| 44 | 389 | 575 | 2.1 |
| 46 | 389 | 575 | 2.45 |
| 48 | 389 | 575 | 2.75 |
| 50 | Opened; pack removed for cooling. | | |
| 57 | Pack disassembled and item 8 released. | | |

The article 8 had a depth of draw of 32 mm. The surface quality was good and little evidence of microsphere crushing was evident.

The procedure was repeated using the sandwich product of Example 2 in which the outer skins were glass fibre reinforced PEEK. The resulting shaping had a similar depth of draw. A further shaping was produced from the carbon fibre reinforced PEEK surfaced laminate of Example 2. A similar shaping of good surface quality was produced.

EXAMPLE 4

The procedure of Example 3 was modified by using an apparatus in which the formng chamber was provided by a pair of heated platens each provided with an annular band of matched dimensions. The bands attached to the platens formed a chamber on being brought together at their matching perimeters. In addition, the lower half of the chamber was provided with a female mould having the shape of a circular ashtray of internal dimension approximately 28 mm deep and diameter 100 mm. Using this apparatus in the procedure of Example 3 a circular flat slab stock of material described in Example 1, of diameter 150 mm and having a thickness of 2 mm was made into a pack between a pair of diaphragms of polyimide film 0.125 mm in thickness. The polyimide film used was 'Upilex' R, supplied by Ube Industries Limited.

The pack was placed between the halves of the chamber with the platens being maintained at about 340° C. A vacuum was drawn in the enclosed space and the pack was left for 10 minutes before applying a pressure of 1 atmosphere over a period of 5 minutes to the upper diaphragm of the pack to mould the slab into the female mould. After 60 minutes the pressure was released. The foam slab was removed from between the diaphragms and found to have taken up the shape of the ash tray mould with precision. The surface quality was good, particularly on the side contacting the mould.

I claim:

1. A method of forming a shaped article of preformed, thermoplastic, syntactic foam material of hollow microspheres in a thermoplastic polymer matrix comprising:
    (a) contacting at least one source of the preformed syntactic foam with a plastically deformable diaphragm member;
    (b) heating the assembled foam and diaphragm member to a temperature above the softening point of the thermoplastic polymer matrix;
    (c) applying differential pressure across the assembled foam and diaphragm member to cause the foamed material to conform to a desired shape; and
    (d) allowing the shaped foam to cool to a temperature below said softening point whereby the foam retains the desired shape.

2. A method according to claim 1 in which the foam stock is formed whilst confined between a pair of plastically deformable diaphragms.

3. A method according to claim 1 wherein the plastically deformable diaphragm members are plastically deformable metal diaphragms.

4. A method according to claim 1 wherein the plastically deformable diaphragms are of an organic thermoplastic material which has a minimum forming temperature equal to or greater than the flow temperature of the thermoplastic matrix of the foam stock.

5. A method according to claim 4 wherein at least one of the thermoplastically deformable diaphragms becomes integral with the foam stock during the shaping of the article and forms part of the final shaped article.

6. A method according to claim 1 in which the foam stock is provided with a coating of fiber reinforced material before the foam stock is shaped.

7. A method according to claim 6 in which the coating is laid up in loose contact with the foam stock and becomes integral with the foam stock as a result of the conditions used in shaping the article.

8. A method according to either of claims 6 or 7 in which the fiber reinforced coating material consists of a fibre reinforced thermoplastic layer in which the fibres are continuous, collimated fibres interwoven or overlaid to provdie quasi-isotropic reinforcement in the layer.

* * * * *

UNITED STATES PATENT AND TRADEMARK OFFICE
CERTIFICATE OF CORRECTION

PATENT NO. : 4,876,055

DATED : October 24, 1989

INVENTOR(S) : CATTANACH, James B.

It is certified that error appears in the above-identified patent and that said Letters Patent is hereby corrected as shown below:

On the title page insert:

--[30] Foreign Application Priority Data

Feb. 9, 1987 [GB] United Kingdom..........8702847--

Signed and Sealed this

Twentieth Day of November, 1990

Attest:

HARRY F. MANBECK, JR.

Attesting Officer

Commissioner of Patents and Trademarks